(12) United States Patent
Rösler et al.

(10) Patent No.: US 6,913,306 B2
(45) Date of Patent: Jul. 5, 2005

(54) FOLDING VEHICLE ROOF FOR A MOTOR VEHICLE

(75) Inventors: Matthias Rösler, Stuttgart (DE); Wojciech Wezyk, Sindelfingen (DE); Thomas Halbweiss, Remseck (DE); Andreas Hasselgruber, Eberdingen-Nussdorf (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/732,148

(22) Filed: Dec. 10, 2003

(65) Prior Publication Data
US 2004/0119316 A1 Jun. 24, 2004

(30) Foreign Application Priority Data
Dec. 11, 2002 (DE) .......................................... 102 58 053

(51) Int. Cl.[7] .................................................. B60J 7/08
(52) U.S. Cl. .................................... 296/107.17; 296/108
(58) Field of Search ....................... 296/107.17, 107.16, 296/108, 116

(56) References Cited

U.S. PATENT DOCUMENTS

| | | | | | |
|---|---|---|---|---|---|
| 5,785,375 | A | * | 7/1998 | Alexander et al. | 296/108 |
| 6,663,164 | B1 | * | 12/2003 | Guillez et al. | 296/108 |
| 6,695,384 | B2 | * | 2/2004 | Obendiek et al. | 296/107.09 |
| 6,767,046 | B1 | * | 7/2004 | Guillez et al. | 296/108 |
| 6,796,598 | B2 | * | 9/2004 | Guillez et al. | 296/108 |

FOREIGN PATENT DOCUMENTS

DE          101 08 493      9/2001

* cited by examiner

*Primary Examiner*—Stephen Gordon
(74) *Attorney, Agent, or Firm*—Klaus J. Bach

(57) ABSTRACT

In a folding vehicle roof, particularly for passenger cars, comprising roof parts of which one forms a support for an adjacent follower roof part, the support roof part is supported on the vehicle body, and the follower roof part is supported on the support roof part each by a four-link operating mechanism forming, with the support roof part, a connecting linkage in the form of a parallelogram having connecting points to four link operating mechanisms defined by corner points of congruent essentially rectangular connecting triangles.

15 Claims, 2 Drawing Sheets

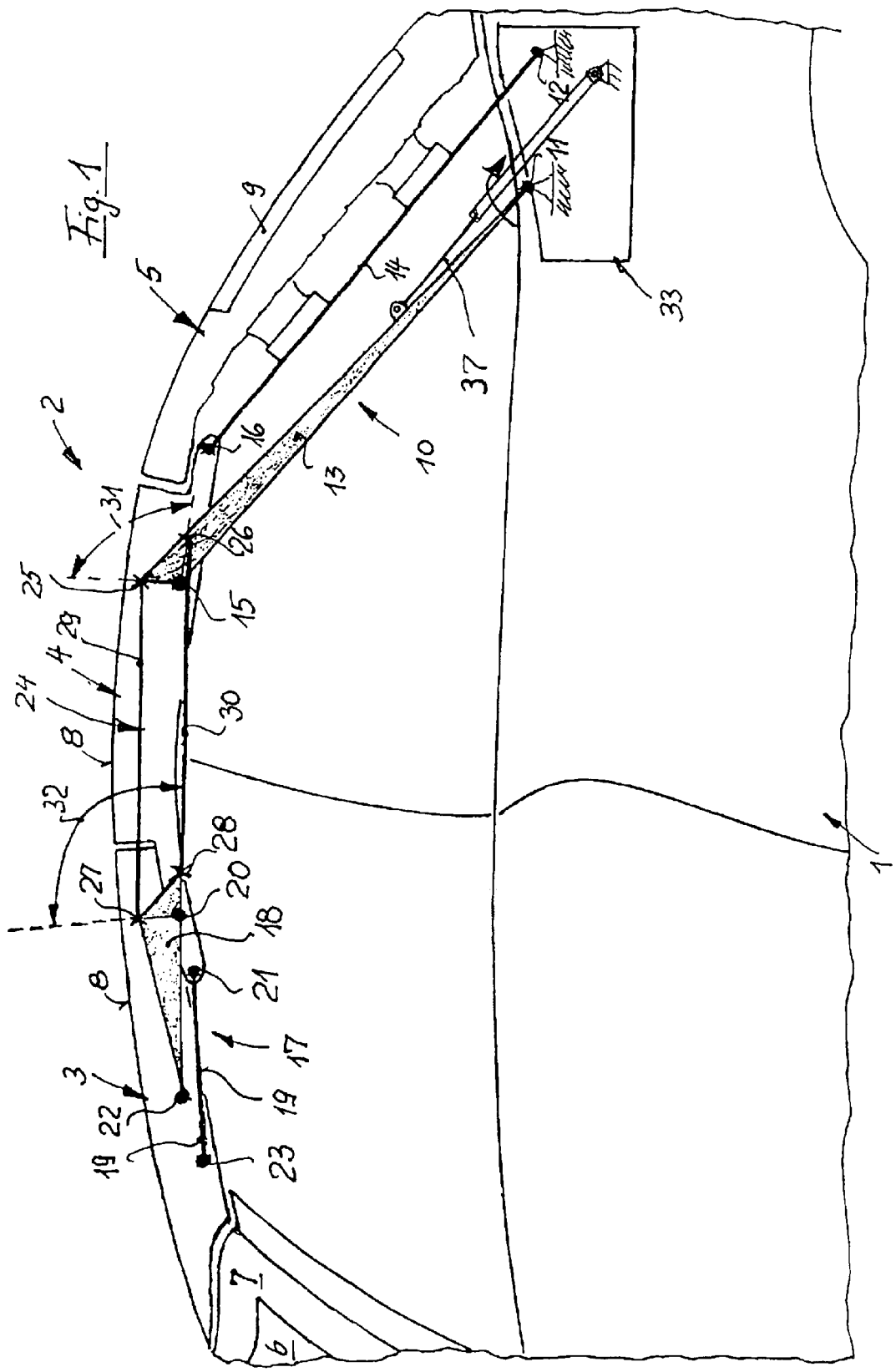

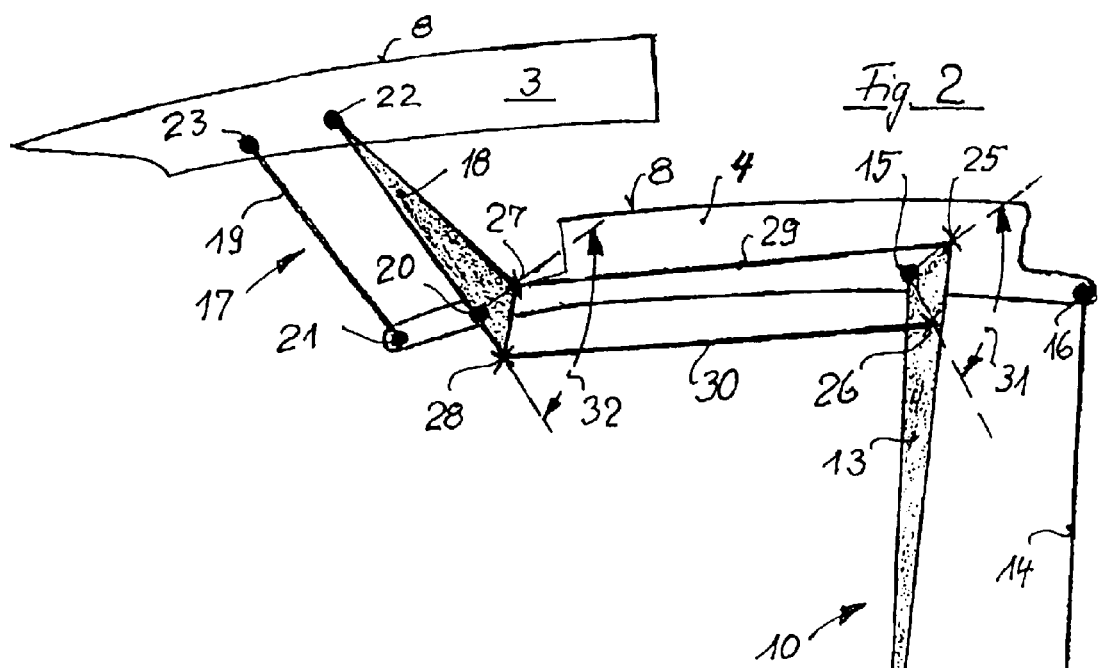
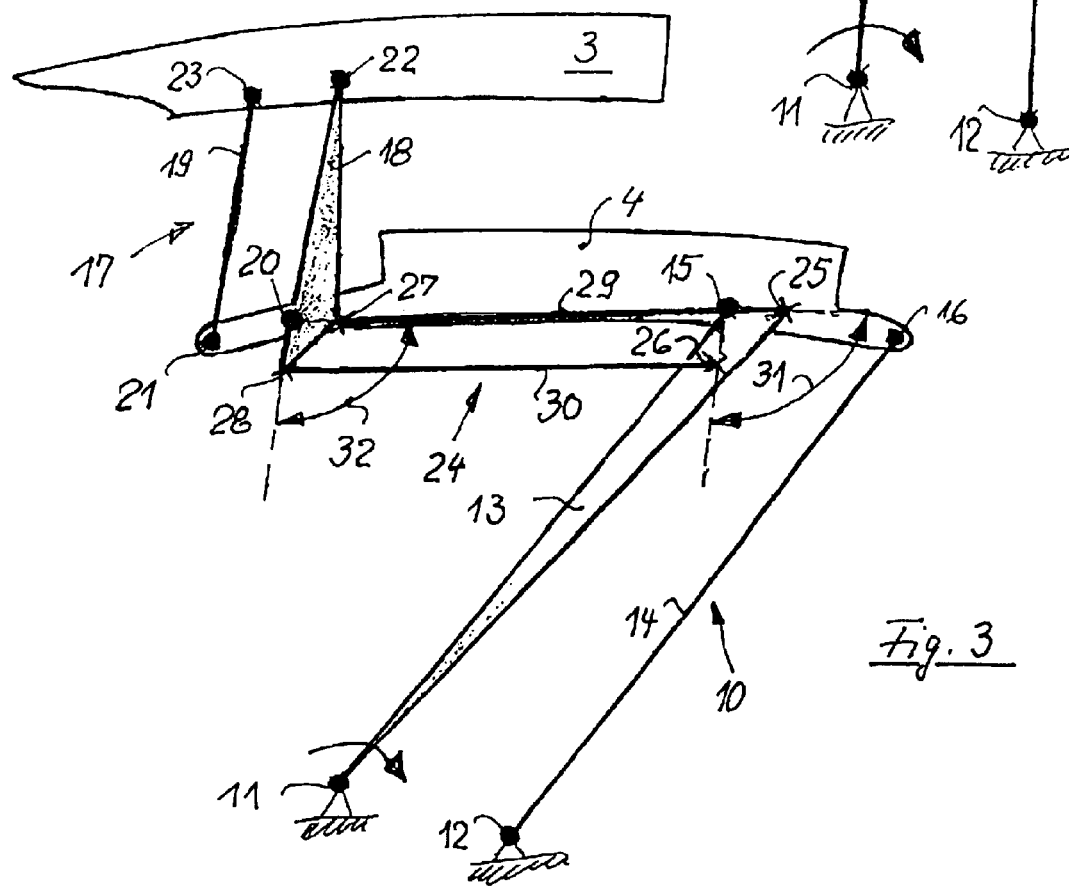

FOLDING VEHICLE ROOF FOR A MOTOR VEHICLE

BACKGROUND OF THE INVENTION

The invention relates to a folding vehicle roof for a motor vehicle, particularly a passenger car, with roof elements which are movable relative to a base structure and of which one roof element supports an adjacent roof element and both are supported by four-link operating mechanisms.

DE 101 08 493 A1 discloses a folding roof of this type with several roof elements which are displaceable with respect to the vehicle body on which they are supported. The roof elements comprise a front part disposed adjacent the windshield frame, a center part and a rear part. The front part, which in the longitudinal vehicle direction, is disposed adjacent the center part is supported by the adjacent center part. The center part again is supported on the vehicle body by means of a four-link operating mechanism including two pivot arms which extend parallel and in spaced relationship and are pivotally connected to the vehicle body. One of the two pivot arms forms a drive arm and is connected by way of guide links in the form of a parallelogram-like pair of support arms with the transfer arm, which supports the front part on the support element of the center part. The arm of the parallelogram-type pair of support arms is firmly connected to the center part and carries the connecting points of the four-link operating mechanism on the center part, whereas the other arm of the parallelogram-type pair of support arms is adjustable relative to the center part in the longitudinal vehicle direction by way of its connection to the drive arm and the transfer arm.

In the area where this adjustable arm is connected to the transfer arm, a step-up transmission structure is provided which is in the form of an additional four-link mechanism and includes a link which interconnects the arms of the parallelogram-type pair of support arms and which is disposed adjacent the transfer arm and extends about parallel thereto.

The four-link operating mechanism which interconnects the center part and the support structure that is the vehicle body, forms with the drive arm also the support for the rear roof part of the vehicle roof, which generally includes the rear window and which, with the roof open, is disposed in a storage compartment upside down below the center part and the front part. The front and center roof parts are disposed in the storage compartment stacked on top of one another in their original orientation and on top of the rear part.

The arrangement of the support linkage interconnecting the four-link operating mechanism and the pivot support thereof with respect to the support linkage provide, in connection with the respective dimensioning and arrangement of the individual transfer members of the four-link operating mechanism formed by the support arms and linkages, with the desired space-saving and flat construction, disadvantageous transfer ratios or conditions, which result in high joint forces in the respective support joints and a relatively complicated design.

It is the object of the present invention to provide a vehicle roof of the type described in the introductory part, which however is simple in its design and provides for advantageous load or stress conditions particularly in the joints and linkage points which are subjected to the operating forces.

SUMMARY OF THE INVENTION

In a folding vehicle roof, particularly for passenger cars, comprising roof parts of which one forms a support for an adjacent follower roof part, the support roof part is supported on the vehicle body, and the follower roof part is supported on the support roof part, each by a four-link operating mechanism forming, with the support roof part, a connecting linkage in the form of a parallelogram having connecting points to the four link operating mechanisms defined by corner points of congruent essentially rectangular connecting triangles.

The arrangement of the linkage between the operating arm and the transfer arm, which is independent of the support function for the center part as support element, facilitates the provision of a structure wherein the force transmission ratios are independent of the respective angular positions of the drive arm and the transfer arm and, consequently, the position of roof elements relative to each other, so that the force transmission ratios can be optimized. As a result, the operating forces can be reduced so that, in addition to the respective operating and force transfer members, also the drive can be optimized and the stresses on the vehicle support structure resulting from operating the roof element can be reduced.

The arrangement according to the invention is particularly expedient for three-part vehicle roofs, including a front part, a center part and a rear part, wherein the center part forms the support element for the front part, which acts as a follower. However, it is also within the scope of the present invention to interconnected the individual roof elements of vehicle roofs which include a larger number of roof elements, for example roofs with several roof elements disposed between the front and the rear roof parts, and to interconnect the individual parts in accordance with the invention so that they are pivotable and can be power operated. It is further within the scope of the present invention to employ the arrangement according to the invention also in connection with a roof which includes only two roof elements wherein the center roof part and the rear roof part are combined to form a single element. Such an arrangement is particularly expedient if the rear roof part is relatively low and flat.

With regard to the arrangement of the link triangles which are determined by the pivot support points of the drive arm and the transfer arm on the support element and the respective connecting joints of the guide levers of the operating mechanism it has been found expedient if the angle between their legs which intersect at the pivot point of the drive and the transmission arms, is in the range of about 90°. Depending on the conditions however, this angle may be smaller or larger and also the legs of the mutually congruent support triangles may by differently long, for example, for adaptation to spatial and operational conditions. However, preferably, the legs of the mutually congruent support triangles have at least approximately the same length and enclose an angle of about 90°.

It has been found to be particularly expedient if in the area of the end positions of the roof elements the guide levers of the operating mechanism formed by a parallelogram-type pair of guide levers provide for a maximum lever arm with respect to the pivot joint of the transfer arm or, respectively, the drive arm whereas the other guide lever extends in such a way that it coincides with, or extends adjacent to, a straight line interconnecting the pivot points of the transfer arm and of the drive arm.

In summary, regarding a multi-part folding vehicle roof with three hard top roof parts comprising a front part, a center part and a rear part, the invention concerning an arrangement, wherein the front part is arranged, with its topside up, over the center part and the front part and the center part together form a packet, which is disposed in a rear storage compartment on top of a rear part pivoted into the storage compartment such that its bottom part faces upwardly. The center part is pivotally supported on the vehicle body and the front part is pivotally supported on the center part, each by a four-link operating mechanism. The rear part is connected to the four-link operating mechanism which supports to the center part. The four-link operating mechanism supporting the front part is drivingly connected to the four-link operating mechanism supporting the center part by way of a guide link, which interconnects a transfer arm and a drive arm of the four-link operating mechanism for the center part. The operating mechanism is formed by a parallelogram-type pair of operating arms, whose pivot connections with the drive arm and with the transfer arm define corresponding end points of congruent and equally oriented connecting triangles having corners which are disposed at the connecting points of the drive arms for the center part.

Further details and features of the invention will become more readily apparent from the following description of a particular embodiment thereof on the basis of the accompanying drawings.

BRIEF DESCRIPTION OF THE DRAWINGS

FIG. 1 shows, in a longitudinal sectional view, a multi-part foldable vehicle roof with front, intermediate and rear roof parts wherein the rear roof part is shown to include a rear window and all roof parts are shown in the closed position of the vehicle roof, FIG. 2 is a simplified representation of the basic roof operating mechanism shown in FIG. 1 with the roof in a partially open position, and FIG. 3 shows the roof operating mechanism in a further open position before reaching a fully open folded storage position.

DESCRIPTION OF A PREFERRED EMBODIMENT

In the figures, the vehicle body, which is indicated only by its contour as a passenger car, is designated by the reference numeral 1. The interior space of the vehicle is covered by a foldable vehicle roof 2, which, in the shown embodiment, is a three-part hardtop including a front part 3, a center part 4 and a rear part 5. The front part 3 is disposed adjacent the upper frame member 7 of the windshield 6 and, in its closed position, is locked to the upper windshield frame member 7 in a well-known manner.

In the shown roof cover embodiment in the form of a hard-top, the front part 3, the center part 4 and the rear part 5 are shell-like rigid elements whose outer skin facing away from the vehicle interior form the roof skin 8 as shown for the front part 3 and the center part 4. However, embodiments wherein the front part 3 and the center part 4 form only a support structure or a support frame for a flexible cover as they are used for so-called soft tops are also within the scope of the present invention.

The rear roof part 5 generally includes a rear window integrated into the rear roof part 5. However, the rear roof part 5 may also consist of a frame-like support structure for the rear window 9, which is removably supported thereon for example in order to provide for a more compact, thinner configuration of the rear roof part in the roof storage compartment when the vehicle roof is open.

In the embodiment shown, the roof is supported on the vehicle body 1 by a four-link operating mechanism 10, which is generally mounted to the vehicle body by way of a console 33 which also supports a drive means 37. In this way, the operating forces needed for pivoting the roof parts can be accommodated by the console 33.

The base support joints 11 and 12 for the arms 13 and 14 of the four-link operating mechanism 10 are indicated only symbolically and are for example integrated into the respective console 33. At the roof end, the arms 13 and 14 of the four-link operating mechanism 10 are pivotally connected to the center part 4 of the vehicle roof at pivot joints 15, 16, which may be elastically mounted to the center roof part 4. The center roof part 4 forms a support structure for another four-link operating mechanism 17 by which the front part 3 is mounted as a follower element to the center roof part 4.

The four-link operating mechanism 17 again comprises arms 18 and 19, of which, analogous to the drive arm 13 of the four-link operating mechanism 10, the arm 18 is a force transmitting arm whereas the arm 19, analogous to the arm 14, has mainly guide functions. The pivot joints of the force transfer arm 18 and of the guide arm 19 at the center part 4, which forms the support structure for the front part 3, are indicated by the numerals 20 and 21. Their pivot joints at the front roof part 3, which is a follower element are indicated by the numerals 22 and 23. With respect to the position relative to the center part 4, the pivot joints 15 and 20 of the drive arm 13 and the force transfer arm 18 are disposed adjacent one another, whereas the pivot joints 16 and 21 are displaced in the longitudinal vehicle direction toward the rear and the front respectively. When the roof is closed, all the pivot joints 15, 16 and 20, 21 are disposed essentially at the same level.

In the longitudinal vehicle direction, the pivot joints 20, 21 of the four link operating mechanism 17 at the center roof part 4 are disposed on a forwardly extended structure, which is covered by the front part 3. Of the rear pivot joints 15, 16 of the four link operating mechanism 10 attached to the center roof part 4 only the rear-most pivot joint 16 is disposed on a rearward projecting structure of the center roof part 4 and is covered by the rear roof part 5. The four-link operating mechanisms 10 and 17 are each in the form of parallelograms with the arms 13, 14 and 18, 19 respectively, being disposed in parallel. When the roof is closed as shown in FIG. 1, the drive arm 13 of the four link operating mechanism 10 is displaced with respect to the guide arm 14 in the direction toward the vehicle interior. The guide arm 19 of the four-link operating mechanism 17 on the other hand is displaced with respect to the force transfer arm 18 toward an area away from the interior vehicle space while, in the shown closed position of the vehicle roof, both arms extend in the longitudinal vehicle direction with the guide arm 19 being displaced forwardly with respect to the force transfer arm 18. In this arrangement according to the invention, the inner arm 13 of the four-link operating mechanism 10 and the outer arm 18 of the four-link mechanism 17 are used as force transmitting or drive arms.

The force transmitting drive arm 13 of the four-link operating mechanism 10 is connected to the force transmitting transfer arm 18 of the four-link operating mechanism 17 by way of a link 24 whose connecting points to the drive arm 13 are indicated by the reference numerals 25 and 26 and whose connecting points to the transfer arm 18 are indicated by the reference numerals 27 and 28. Corresponding connecting points 25, 27 and 26, 28 are disposed on a straight parallel line and are shown in the figure symbolically. They are interconnected by parallel links 29 and 30, which extend in parallel relationship and spaced relationship so that they form a parallelogram. The connecting points 25, 26 to the drive arm 13 and the connecting points 27, 28 to the transfer arm 18 are each disposed on the base corner points of a triangle, whose legs intersect at the connecting points 15 and, respectively, 20 of the drive arm 13 at an angle of about 90° and, respectively, the transfer arm 18 to the center part 4. The corresponding triangles 20, 27, 28 and 15, 25, 26 are congruent and oriented in the same way, so that synchronous pivot movements are obtained for the drive arm 13 and the transfer arm 18 and the same transmission ratios are present over the pivot extent.

Preferably, the angle enclosed by the legs of the drive triangles as indicated in the figures by the arrows 31 and 32 is about 90° and, preferably, the arrangement overall is such that, in the closed position of the roof as shown in FIG. 1, the support triangles have a position in which the link 30 is in a stretch position that is it provides a maximal, that is, ideal, lever arm for the link 29. This is advantageous with regard to the forces needed for the opening of the roof 2, that is, for raising the front part 3, The opening forces in the link 29 are tension forces so that this link is stressed in an advantageous way. With respect to the closed position, or, respectively, an intermediate position of the roof as shown in FIG. 3, the conditions are reversed. There, the upper link 29 is essentially parallel to the connecting line between the connecting points 15 and 20 of the drive arm 13 and the transfer arm 18 to the center part 4, while the parallel lower link 30 has the maximum lever arm with respect to the connecting point 15.

In the transition position as shown in FIG. 2 the arrangement provides between the end positions of the roof for an advantageous force distribution to the links 29, 30 of the linkage with correspondingly low stresses for the joints provided at the connecting points. As a result, in the intermediate as well as the end positions (FIGS. 1 and 3), the stresses in the joints remain relatively small since, because of the almost ideal lever arrangements, relatively small operating forces are needed.

Notwithstanding the idealized representation of the links 29, 30 and the arms 13, 14 and 18, 19 as straight lines, these components may be curved in adaptation to the given space conditions that is they may be spatially bent rods or shaped bodies such as stamped metal parts.

It is also possible within the scope of the invention to support the basic support joints 11 and 12, which are preferably mounted on the console 33 in such a way that they are displaceable relative to each other as it is known for example from DE 101 08 493 A1 in order to provide for an adjustability of the open and closed end positions of the vehicle roof.

In the figures, the arrangement according to the invention is shown only for the roof support at one side of the roof. However, the arrangement is symmetrical with respect to the longitudinal center plane of the vehicle with an operating mechanism being provided at the right and left sides of the vehicle roof.

What is claimed is:

1. A folding vehicle roof particularly for passenger cars, comprising front center and rear roof parts (3, 4, 5), which are supported so as to be movable relative to one another and relative to a support base (1), one of said roof parts (4) forming a support element for an adjacent follower one of said roof parts (3), said support element (4) being supported on said support base (1) and said follower roof part (3) being supported on said support element (4), each of said support element (4) and said follower roof part (3) being supported by a four-link operating mechanism (10, 17), a drive means (37) for actuating a drive arm (13) of the four-link operating mechanism (10) of said support element (4) said drive arm is connected to a transfer arm (18) of the four-link operating mechanism (17) of said follower roof part (3) by a connecting linkage, said connecting linkage being in the form of a parallelogram linkage including links (29, 30) having connecting points (25, 26, 27, 28) to the drive arm (13) and to the transfer arm (18) defined by the corner points of congruent connecting triangles defined at connecting points (15, 20) on the support element (4) of the drive arm (13) and the transfer arm (18).

2. A folding vehicle roof according to claim 1, wherein said support element is formed by the center roof part (4).

3. A folding vehicle roof according to claim 1, wherein said support base (1) is a vehicle body.

4. A folding vehicle roof according to claim 1, wherein the drive means (37) for the four-link mechanism is connected to the drive arm (13) of the support element (4).

5. A folding vehicle roof according to claim 1, wherein said drive means (37) for the support element (4) is formed by the drive arm (13) of the four-link operating mechanism (10), which supports the support element (4).

6. A folding vehicle roof according to claim 1, wherein the drive means (37) for the drive arm (13) of the supporting four-link operating mechanism (10) is connected to the support element (4).

7. A folding vehicle roof according to claim 1, wherein, with the roof (2) open, the follower roof part (3) is disposed on top of the support element (4) whose outside surface is facing outwardly.

8. A folding vehicle roof according to claim 2, wherein said follower roof part (3) is the front roof part, which is supported by the center roof part (4) to which the rear roof part is connected.

9. A folding vehicle roof according to claim 8, wherein, in an open position of the roof (2), said front roof part (3) and said center roof part (4) are disposed on top of each other above the rear roof part (5), which is pivoted into an upside down position.

10. A folding vehicle roof according to claim 8, wherein the rear roof part (5) is connected to the center roof part (4) which is supported by the four-link operating mechanism (10) supporting the center roof part (4).

11. A folding vehicle roof according to claim 1, wherein center angles of the connecting triangles are about 90°.

12. A folding vehicle roof according to claim 8, wherein in a closed position of the vehicle roof, the center roof part (4) and the front roof part (3) are disposed essentially in alignment.

13. A folding vehicle roof according to claim 12, wherein, in the closed position of the vehicle roof (2) in which the support element or center roof part (4) and the follower part or front roof part (3) are in alignment, corresponding legs of the connecting triangles which are interconnected by a link (30) are disposed essentially on a straight line extending through the connecting points (15, 20) of the drive arm (13) and the transfer arm (18) to the support element.

14. A folding vehicle roof according to claim 12, wherein, in an open position of the roof (2) wherein the front roof part 3 is pivoted on top of the center roof part (4), corresponding legs of the congruent connecting triangles which are interconnected by a link (29) are disposed essentially on a straight line between the connecting points (15, 20) of the drive arm (13) and the transfer arm (18) to the center roof part (4).

15. A folding vehicle roof according to claim 13, wherein, when another one of said legs of the respective connecting triangles extends parallel to a straight line extending through the connecting points (15, 20) of the transfer arm (18) and the drive arm (13) of the center roof part (4), another leg of the connecting triangles extends about at a right angle to adjacent link (19) or, respectively, the link (30) interconnecting points (26, 28) of the transfer arm (18) and the drive arm (13).

* * * * *